No. 811,870. PATENTED FEB. 6, 1906.
H. QUITTNER.
DRINKING AND FEEDING APPLIANCE FOR BIRD CAGES.
APPLICATION FILED DEC. 20, 1904.
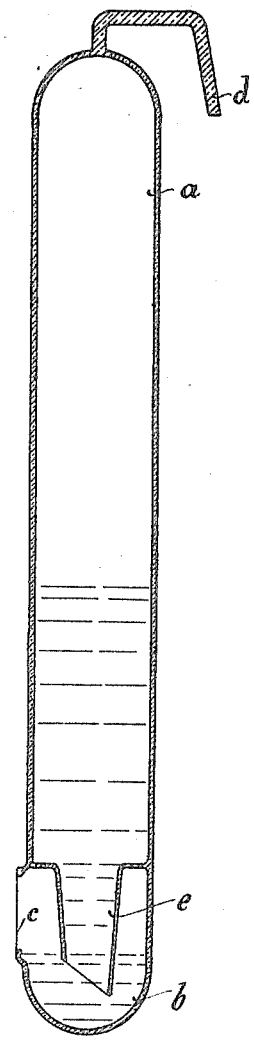
Witnesses
George G. Schoenlank
Thomas Kilpatrick
Inventor
Hermann Quittner,
by H. van Oesenwel
Attorney

UNITED STATES PATENT OFFICE.

HERMANN QUITTNER, OF BERLIN, GERMANY.

DRINKING AND FEEDING APPLIANCE FOR BIRD-CAGES.

No. 811,870. Specification of Letters Patent. Patented Feb. 6, 1906.

Application filed December 20, 1904. Serial No. 237,714.

*To all whom it may concern:*

Be it known that I, HERMANN QUITTNER, a subject of the King of Prussia, German Emperor, residing at 50 Oranienstrasse, Berlin, S. 42, in the Kingdom of Prussia and Empire of Germany, have invented new and useful Improvements in Drinking and Feeding Appliances for Bird-Cages, of which the following is a specification.

My invention relates to drinking and feeding appliances designed for bird-cages and made on the principle of a common siphon-barometer, and more especially to an appliance of this kind comprising a tubular vessel which is closed at the top and bottom and which has an aperture at one side near the bottom, such vessel being provided inside with a transverse partition formed just above the said aperture and having an opening from which a small tube depends which is open at its lower end.

In the vessels heretofore used the lower end of the small tube through which communication is established between the upper compartment serving as a reservoir and the lower compartment serving as a feeding-basin is cut square—that is to say, at right angles to the axis of the tube—which has the disadvantage that by the action at the vacuum formed in the upper part of the vessel on the one hand and the outer air-pressure on the other hand the water is kept in equilibrium, so that the feeding-basin may be emptied without water being allowed to flow from the reservoir. To remedy this drawback is the object of my said invention, according to which the lower end of the aforesaid small tube is cut obliquely.

In the accompanying drawing is represented a longitudinal section of an appliance embodying this improvement.

This appliance comprises a cylindrical tube *a*, the upper and lower ends of which are closed. A short distance above its bottom end the tube is provided at one side with an aperture *c*, and a small tube *e* joins the tube *a* just above this aperture and extends downward. The upper part of the tubular vessel thus constructed forms the reservoir, and the lower part *b* forms the feeding-basin with the aperture *c*. For the purpose of insuring the outflow from the reservoir to the feeding-basin *b* in proportion to the removal of water from the latter by the bird the bottom end of the aforesaid small tube is cut obliquely for facilitating the entrance of air-bubbles.

For enabling the drinking vessel to be conveniently placed in the bird-cage it is provided at its upper end with a hook-shaped extension *d*, by means of which it may be suspended in the cage at any desired height.

The appliance hereinbefore described may in like manner be used as a feeding vessel, in which case the food adjusts itself according to its slope in the lower feeding-basin.

What I claim as my invention, and desire to secure by Letters Patent, is—

In an appliance of the character described, the combination, with a tubular vessel closed at the top and bottom and having an aperture at one side near the bottom, of a transverse partition formed just above the upper edge of said aperture and provided with an opening, and a tube depending from said opening and having its lower end open and cut obliquely to the longitudinal axis of the tube, substantially as and for the purpose herein set forth.

In testimony whereof I have signed my name to this specification in the presence of two subscribing witnesses.

HERMANN QUITTNER.

Witnesses:
 EMIL PREUK,
 JULIUS RHODE.